April 25, 1961 M. K. EMERZIAN 2,981,211
FOOD-PRODUCT FORMING MACHINE
Filed July 17, 1958
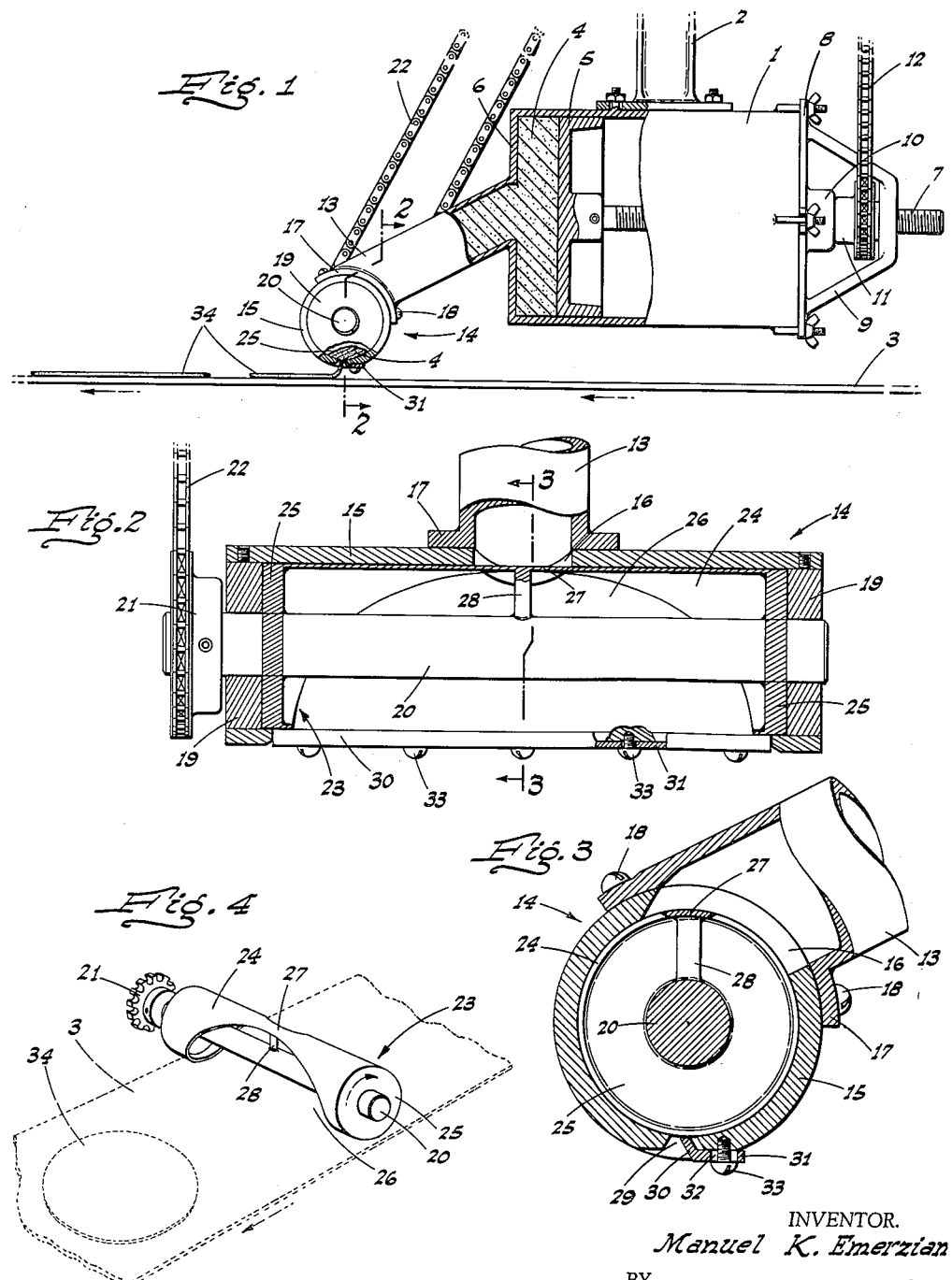
INVENTOR.
Manuel K. Emerzian
BY
Webster & Webster
ATTYS.

United States Patent Office 2,981,211
Patented Apr. 25, 1961

2,981,211
FOOD-PRODUCT FORMING MACHINE
Manuel K. Emerzian, P.O. Box 327, Parlier, Calif.
Filed July 17, 1958, Ser. No. 749,199
2 Claims. (Cl. 107—14)

The present invention is directed to, and it is a major object to provide, a power actuated machine of novel construction and function operative to successively produce a flour dough product.

Another important object of the present invention is to provide a food-product forming machine, as above, which is especially adapted to produce tortillas, or the like, which are flat, of constant thickness, and of predetermined configuration—usually circular—in plan.

An additional object of the invention is to provide a machine—as in the preceding paragraph—which includes a novel product forming head unit comprised of an extrusion cylinder having a slot therein through which the dough is extruded in predetermined thickness from within said cylinder, and a rotary sleeve gate in the cylinder arranged to vary the effective or working length of such slot in a manner to impart to the extruded dough the desired shape—in plan—of the resultant product. Further, the rotary sleeve gate recurringly completely closes the slot to attain separation between successive products as formed by said head unit.

A further object of the invention is to provide a machine of the type described which is operative to automatically and effectively form the food products in relatively rapid succession while maintaining uniformity in thickness and shape.

It is also an object of the invention to provide a food-product forming machine which is designed for ready and economical manufacture, convenience of use, and long service with a minmum of repair and maintenance.

A still further object of the invention is to provide a practical, reliable, and durable food-product forming machine, and one which is exceedingly effective for the purpose for which it is designed.

These objects are accomplished by means of such structure and relative arrangement of parts as will fully appear by a perusal of the following specification and claims:

In the drawings:

Fig. 1 is a side elevation of the machine as in operation; the view being partly broken away and partly in section.

Fig. 2 is an enlarged sectional elevation of the food-product forming head unit; the view being taken on line 2—2 of Fig. 1.

Fig. 3 is a cross section taken on line 3—3 of Fig. 2.

Fig. 4 is a perspective view of the rotary sleeve gate—detached—but illustrates the same in its position relative to the product carry-off conveyor; the latter—with one of the products thereon—being shown in dotted lines.

Referring now more particularly to the drawings and to the characters of reference marked thereon, the machine comprises a horizontal cylindrical body 1 supported in a fixed position by a suitable mount as shown for example in part at 2; such body being disposed adjacent but above a horizontal, product carry-off conveyor 3.

The body 1 is adapted to contain a quantity of flour dough 4 which is maintained under pressure by means of a piston 5 in said body, and which piston is urged toward the forward end 6 by means of a threaded piston rod or screw shaft 7.

The rear end 8 of the body 1 is removably mounted in place as shown, and said screw shaft 7 extends to a termination beyond such removable rear end 8, passing through a bracket 9 centrally of the latter. Between the outer end of said bracket 9 and a boss 10 on the removable rear end 8, the screw shaft 7 has a sprocket-nut 11 threaded thereon. The sprocket-nut 11 is rotated by an endless chain—shown in part at 12—and driven by suitable means (not shown). Upon rotation of the sprocket-nut 11 in a given direction, the screw shaft 7—together with the piston 5—are advanced whereby the dough 4 in the body 1 is maintained under pressure.

To fill the body 1 with dough 4, the rear end 8 is removed and the piston 5 withdrawn, exposing the interior of such body for the introduction of the dough.

A reduced diameter neck or spout 13 extends at a forward and downward incline from centrally of the forward end 6 of body 1; such spout opening at its rear or upper end into the body.

At its forward or lower end, the spout 13 is secured in connection with and supports a horizontal transversely extending product-forming head unit, indicated generally at 14; the bottom of such unit 14 being disposed closely adjacent but above the conveyor 3.

Such head unit 14 is comprised of a horizontal transversely extending extrusion cylinder 15 having a port 16 in the upper portion thereof centrally of its ends. The forward or lower end of the spout 13 registers with the port 16, and a flange 17—together with screws 18—are employed to secure said cylinder 15 to the spout 13.

The cylinder 15 is closed at the ends by circular plugs 19, and a central shaft 20 extends through the cylinder and is journaled in the end plugs 19 as shown; such shaft 20—at one end—projecting beyond the adjacent end plug 19 and there being fitted with a sprocket 21 rotated by an endless chain—shown in part at 22—and driven by suitable means (not shown).

Within the confines thereof and between the end plugs 19, the cylinder 15 contains a rotary sleeve gate, indicated generally at 23; such gate including a sleeve 24 which runs in the cylinder in matching engagement with the inner wall thereof. The sleeve 24 is supported at the ends by discs 25 fixed on the shaft 20 immediately inwardly of the end plugs 19.

The sleeve 24 of the rotary sleeve gate 23 is formed with a relatively large circumferential opening 26 of slightly less than 360 degrees extent whereby a web 27 remains in connection between opposite end portions of said sleeve. The opening 26 is of a configuration such that beginning at the web 27, and in the direction of rotation as indicated in Fig. 4, the opening 26 symmetrically—and with constant progression—increases in width for one-half of its circumferential extent and then correspondingly decreases in width for the remaining one-half of its circumferential extent and back to such web. In other words, the opening 26 is circular; the diameter of such opening corresponding to that of the food product to be produced.

In order to stabilize the web 27, a relatively short radial post 28 spans between the central shaft 20 and said web.

The cylinder 15 is formed in the bottom thereof with a longitudinal extrusion slot 29 of a length no less than the maximum width of the opening 26 in sleeve 24; such extrusion slot 29 having the following means associated therewith to adjust the effective width of such slot circumferentially of the cylinder 15.

A longitudinal lip 30 is disposed in—and extends the full length of—the slot 29, and at its radially outermost edge such lip 30 merges in integral relation with an attachment flange 31 which projects in a direction away from the slot and laps an adjacent portion of the cylinder 15.

The attachment flange 31 is formed—throughout its length—with a plurality of spaced openings 32, and headed screws 33 pass through such opening and secure the flange to the cylinder. The openings 32 are elongated in a direction which permits adjustment of the lip 30 in the slot 29 whereby the effective and desired width of the latter can be attained.

As will be clearly seen from Fig. 3, the side wall of the slot which is opposite the lip 30 is disposed with an outward flare or slope relative to a line drawn through the slot radially of the cylinder 15. Similarly, the lip 30—which actually forms the opposite wall of the slot, as far as the effective width of the same is concerned—is disposed at a flare or slope to such radial line in opposed relation to the slope of the other wall. The radially inner edge of the lip lies substantially at the bore of the cylinder, as shown.

As a result of this arrangement, the width of the dough being extruded is determined at the bore of the cylinder. The dough is thus cut off cleanly at that point, and it is free to drop onto the conveyor without any tendency for the dough to adhere to the walls of the slot and thus possibly causing the shape of the extruded piece to be detrimentally affected.

In operation of the above described machine, with the screw shaft 7 and piston 5 being power advanced—and with the rotary sleeve gate 23 rotating in the cylinder 15 in the direction indicated by the arrow in Fig. 4.—the flour dough 4 is fed under pressure from the body 1 through the spout 13 and into the product-forming head unit.

With the cylinder 15 thus filled with the dough 4 under pressure, such dough is extruded downwardly through the slot 29 in predetermined and constant thickness, which thickness is controlled by pre-adjustment of the lip 30, as aforesaid.

As the dough so extrudes downwardly through the slot 29, each rotation of the sleeve 24 in cylinder 15 causes the extruding dough to assume a circular shape. This is for the reason that immediately upon the web 27 passing the slot 29, the circular opening 26 symmetrically and with constant progression increases the effective or working length of the slot 29 for one-half of the circumferential extent of such opening and correspondingly decreases the effective length of said slot for the remaining one-half of the circumferential extent of the opening.

As a result, a circular food product 34 is extruded by the head unit 14 with each revolution thereof, with such food product being discharged onto the carry-off conveyor 3. The food products 34 are formed separate from each other by reason of the fact that at the end of each product forming revolution of the sleeve 24, the web 27 completely blocks the slot 29 and shuts off the extrusion of dough therethrough.

The machine—constructed and functioning as described—is operative to readily produce flat circular food products 34, such as tortillas or the like, in rapid but separated succession, and with such products having constant thickness and uniform shape.

In order to obtain such desired circular form and constant thickness of the plastic dough as it emerges from the extrusion slot 29 and drops onto the nearby conveyor 3, it is of course obvious that the conveyor must travel at the same linear speed as that of the forming sleeve 24 at its circumference.

From the foregoing description, it will be readily seen that there has been produced such a machine as substantially fulfills the objects of the invention, as set forth herein.

While this specification sets forth in detail the present and preferred construction of the machine, still in practice such deviations from such detail may be resorted to as do not form a departure from the spirit of the invention, as defined by the appended claims.

Having thus described the invention, the following is claimed as new and useful and upon which Letters Patent is desired:

1. In a food-product forming machine, an extrusion cylinder into which dough is fed under pressure, the cylinder having an elongated slot in the bottom for extrusion of the dough, and a movable gate in the cylinder to cut off the dough moving through the slot at the bore of the cylinder; the side walls of the slot flaring out relative to each other from said bore and one such wall being adjustable toward and from the other wall.

2. In a food-product forming machine, an extrusion cylinder into which dough is fed under pressure, the cylinder having an elongated slot in the bottom for extrusion of the dough, and a movable gate in the cylinder to cut off the dough moving through the slot at the bore of the cylinder; one side wall of the slot flaring outwardly relative to a line drawn through the slot radially of the cylinder, a lip forming the opposite wall of the slot disposed at an opposite outward flare relative to such radial line, and means between the lip and cylinder to adjust the lip toward and from said one wall.

References Cited in the file of this patent

UNITED STATES PATENTS

| | | |
|---|---|---|
| 140,695 | Fuller | July 8, 1873 |
| 738,242 | Romero et al. | Sept. 8, 1903 |
| 826,442 | Orr | July 17, 1906 |
| 826,469 | Braschi | July 17, 1906 |
| 1,364,827 | Behr | Jan. 4, 1921 |
| 2,424,949 | White | July 29, 1947 |
| 2,542,691 | Mahle | Feb. 20, 1951 |
| 2,793,598 | Rivoche | May 28, 1957 |
| 2,811,117 | Monaco | Oct. 29, 1957 |
| 2,855,891 | Schmied | Oct. 14, 1958 |